(12) United States Patent
Olive

(10) Patent No.: US 9,221,540 B2
(45) Date of Patent: Dec. 29, 2015

(54) REMOVABLE STEP FOR AN AIRCRAFT, AND AN AIRCRAFT

(71) Applicant: AIRBUS HELICOPTERS, Marignane (FR)

(72) Inventor: Richard Olive, Martigues (FR)

(73) Assignee: Airbus Helicopters, Marignane (FR)

( * ) Notice: Subject to any disclaimer, the term of this patent is extended or adjusted under 35 U.S.C. 154(b) by 121 days.

(21) Appl. No.: 14/247,662

(22) Filed: Apr. 8, 2014

(65) Prior Publication Data

US 2014/0306062 A1    Oct. 16, 2014

(30) Foreign Application Priority Data

Apr. 16, 2013  (FR) ..................... 13 00888

(51) Int. Cl.
*B64C 1/24*  (2006.01)
*B64D 9/00*  (2006.01)

(52) U.S. Cl.
CPC .... *B64D 9/00* (2013.01); *B64C 1/24* (2013.01)

(58) Field of Classification Search
USPC .......... 244/129.6; 296/75; 280/163; 105/443, 105/447; 182/89, 90
See application file for complete search history.

(56) References Cited

U.S. PATENT DOCUMENTS

| | | | | |
|---|---|---|---|---|
| 2,158,949 A | | 5/1939 | Sarles et al. | |
| 2,417,987 A | * | 3/1947 | McFarland | B64C 1/24 105/447 |
| 3,784,247 A | * | 1/1974 | Mills | B60N 3/06 296/75 |
| 3,904,155 A | * | 9/1975 | Chavis | B64C 27/00 224/401 |
| 3,971,456 A | * | 7/1976 | Yonce | B62D 49/005 182/90 |
| 3,986,503 A | * | 10/1976 | Le Guillon | B60R 3/02 182/89 |
| 4,310,193 A | * | 1/1982 | Kolleas | B60N 3/063 248/220.43 |
| 6,220,643 B1 | * | 4/2001 | Kato | B60N 3/06 296/75 |
| 7,566,064 B2 | * | 7/2009 | Leitner | B60R 3/02 280/163 |
| 8,006,803 B2 | | 8/2011 | Guering | |
| 8,905,354 B2 | * | 12/2014 | Griffiths | B64C 1/24 182/89 |
| 2011/0272524 A1 | * | 11/2011 | Gorlich | B64C 1/24 244/129.6 |

FOREIGN PATENT DOCUMENTS

| | | |
|---|---|---|
| EP | 2386484 | 11/2011 |
| FR | 1119246 | 6/1956 |
| WO | 03100204 | 12/2003 |
| WO | 2006131645 | 12/2006 |

OTHER PUBLICATIONS

French Search Report for FR 1300888, Completed by the French Patent Office on Dec. 19, 2013, 6 Pages.

* cited by examiner

*Primary Examiner* — Christopher P Ellis
(74) *Attorney, Agent, or Firm* — Brooks Kushman P.C.

(57) ABSTRACT

A step (10) comprising a portable support assembly (30) having a vertical body (40) carrying a tread (31). The step includes at least two pegs (20) fastened to a fuselage (2). The body (40) includes one fastener orifice (50) per peg (20), said body (40) being carried by said pegs (20). The step includes at least one locking system (60) carried by said body (40) for automatically locking the position of at least one peg (20) in a fastener orifice (50), and manual unlocking means (86) connected to the locking system (60) for enabling the body (40) to be manually separated from the pegs (20).

17 Claims, 4 Drawing Sheets

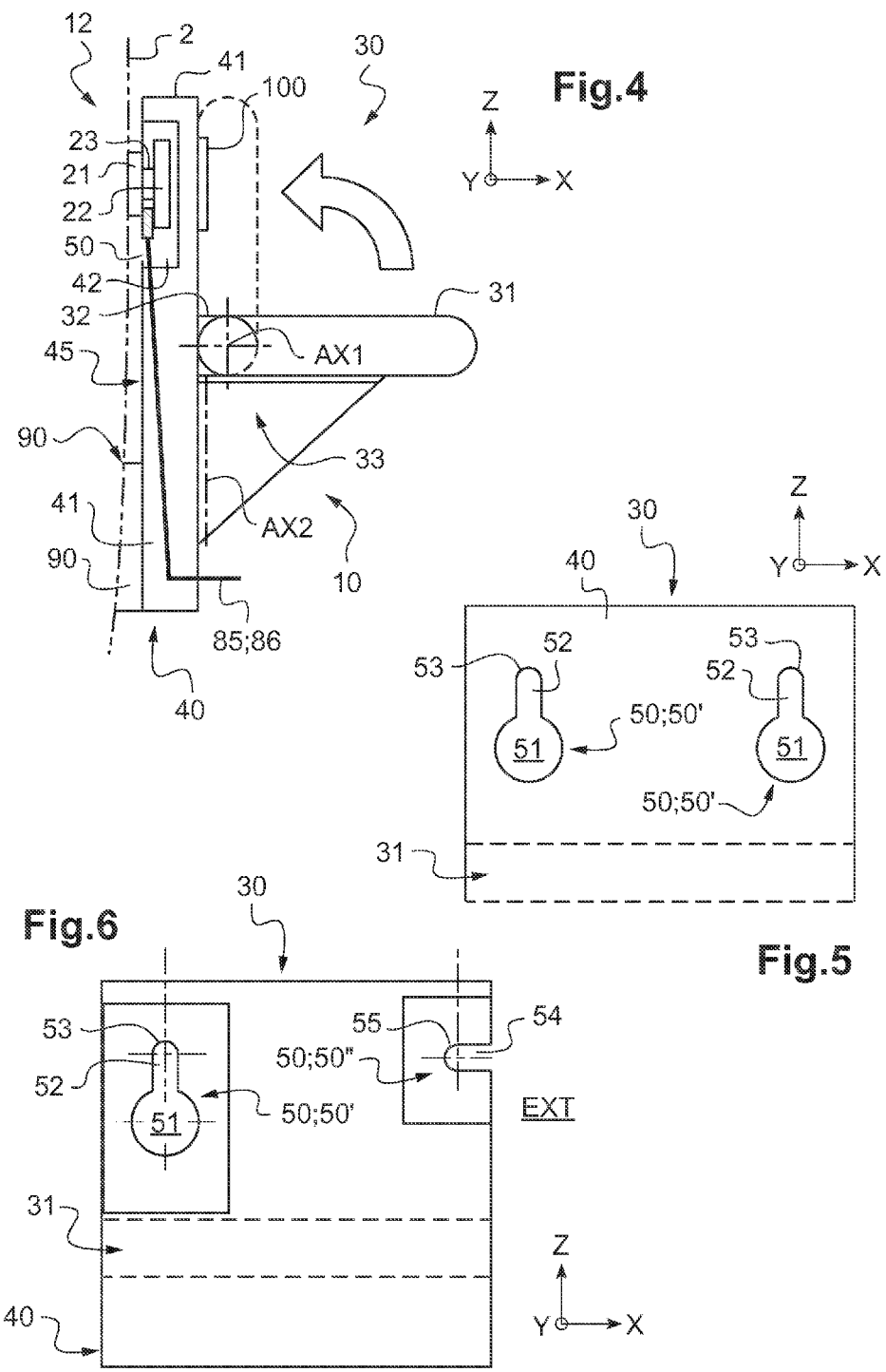

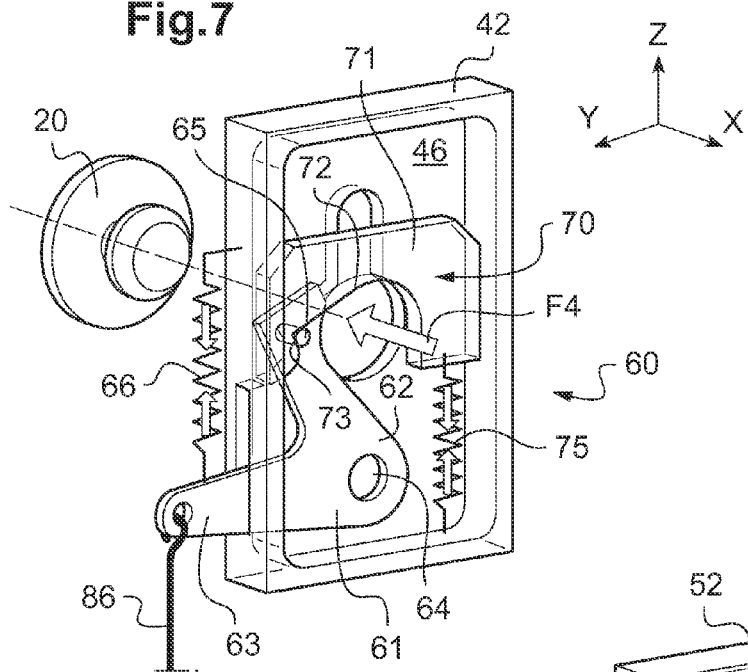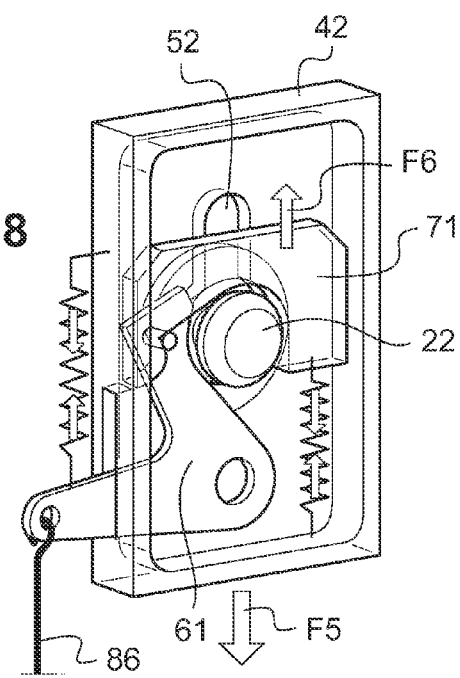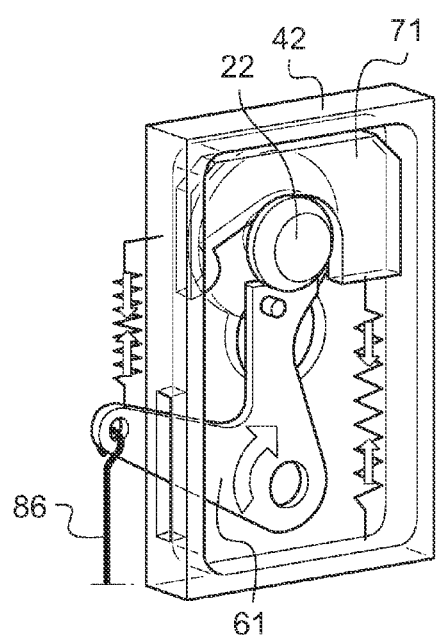

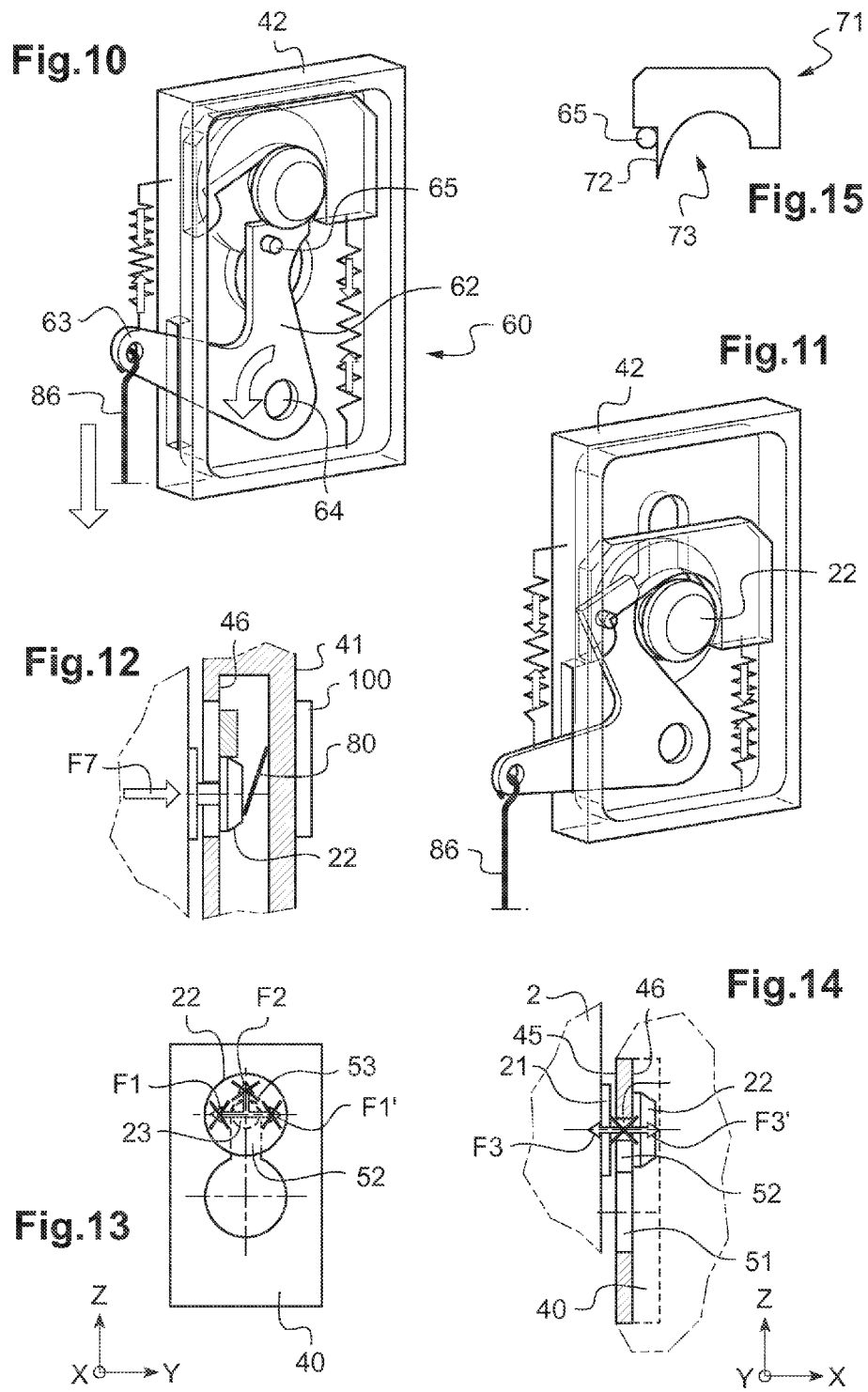

REMOVABLE STEP FOR AN AIRCRAFT, AND AN AIRCRAFT

CROSS REFERENCE TO RELATED APPLICATION

This application claims priority to French patent application No. FR 13 00888 filed on Apr. 16, 2013, the disclosure of which is incorporated in its entirety by reference herein.

BACKGROUND OF THE INVENTION (1) Field of the Invention

The present invention relates to a removable aircraft step, and to an aircraft including such a step.

The invention thus lies in the field of techniques for providing aircraft with steps.

(2) Description of Related Art

Conventionally, an aircraft comprises a fuselage extending longitudinally from a front end towards a rear end on either side of an anteroposterior plane of symmetry, and extending in a vertical direction from a bottom having a landing gear towards a top.

A rotorcraft also includes at least one main rotor for providing lift and propulsion. In order to drive rotation of the main rotor, a rotorcraft may have a main gearbox driven by at least one engine resting on a floor referred to a "transmission support platform".

When performing maintenance operations, an operator may need to have access to zones of the aircraft that are not accessible from the ground, e.g. to the members that are present on the transmission support platform in a high portion of the aircraft.

In order to give safe access to such zones, a manufacturer may use a maintenance ladder. Although practical, a maintenance ladder is found to be heavy and bulky. Such a maintenance ladder may then be difficult to store on board a rotorcraft of small dimensions.

As an alternative, or in addition, an aircraft may include steps that are secured in permanent manner on the fuselage. The steps thus project from the fuselage. Such steps are advantageous but ugly and expensive, and they can even give rise to penalizing aerodynamic drag.

The steps may optionally be masked by being hinged to the fuselage, for example. Thus, a pivotally mounted tread may mask an orifice. An operator can then pivot the treads in order to stand both on them and on the orifices. Nevertheless it can be difficult to locate such steps.

The technical background includes the following Documents: EP 2 386 484, and U.S. Pat. No. 2,158,949.

Document EP 2 386 484 proposes a step incorporated on the fuselage of a helicopter. The step comprises a housing incorporated in the flank of the fuselage and a tread that is pivotally mounted in the housing.

Document U.S. Pat. No. 2,158,949 also proposes a pivotally mounted tread that is permanently mounted on a fuselage.

Technical fields that are remote from the invention include the following Documents: EP 1 888 870, and WO 03/100204.

Document EP 1 888 870 describes a ladder.

Document WO 03/100204 describes a device for fastening a ladder to a facade.

Also known is Document FR 1 119 246.

BRIEF SUMMARY OF THE INVENTION

An object of the present invention is thus to propose a step that is discreet for giving access to parts of an aircraft that are out of reach of an operator on the ground.

The invention thus provides a step for an aircraft, the step comprising a support assembly provided with a vertical body carrying a tread.

The step is remarkable in particular in that the support assembly is portable, the step including:

at least two fastener pegs suitable for fastening to a fuselage of an aircraft, the body of the support assembly having one fastener orifice per peg, the body being carried by the pegs when the body is moved manually towards a fuselage so as to cause each peg to penetrate into a respective fastener orifice;

at least one locking system carried by the body for automatically locking the position of at least one peg in a fastener orifice; and manual unlocking means connected to the locking system to enable the body to be separated manually from the pegs.

The step comprises in particular a group of at least two pegs that are fastened to the orifice of an aircraft.

The pegs project from the fuselage but they are of dimensions having little influence on aerodynamic drag, for example. In addition, such pegs are relatively light in weight.

The use of pegs that by their very nature are of small dimensions also makes it possible to optimize their positions. Installing such pegs is less subject to structural constraints concerning the aircraft.

In particular, such installation does not require cutouts to be made in the fuselage in order to incorporate a housing therein, unlike certain prior art solutions.

In addition, the step also includes a portable support assembly. When an operator needs to access zones that are out of reach from the ground, the operator installs at least one support assembly on a group of pegs fastened to the fuselage. The operator fastens the support assembly temporarily to the fuselage by means of a group of pegs. Such fastening is fast, simple, and temporary.

In addition, the support assembly may be of dimensions that provide an operator with comfort and safety. Nevertheless, these dimensions remain small compared with the dimensions of a ladder, for example. The support assembly is thus also relatively light in weight and may be stored on board the aircraft, unlike a ladder.

Temporarily arranging a tread on a fuselage can be found to be non-obvious and more difficult than arranging a ladder standing on the ground. The teaching concerning ladders is thus very remote from the invention, which needs to address specific problems.

The way in which a support assembly is arranged on a fuselage must in particular be safe in order to avoid any accident.

As a result, the step includes at least one automatic locking system.

When the operator installs the support assembly on a group of pegs, the locking system automatically locks the fastening of the support assembly on the fuselage.

In contrast, the unlocking means must be suitable for being operated manually and deliberately by the operator. The fastening of a support assembly is thus automatic in order to avoid any danger of the operator forgetting to lock the fastening. In contrast, the removal of the support assembly requires a voluntary act on the part of an operator.

The claimed combination thus makes it possible to obtain an innovative step that is safe.

The step may also include one or more of the following additional characteristics.

Thus, each peg may comprise a base connected to a head by a shank presenting dimensions that are smaller than the dimensions of said head. For example, the head may be a cylinder of large diameter while the shank is a cylinder of small diameter.

Under such circumstances, at least one fastener orifice may be a vertical orifice having a bottom inlet portion that is shaped to match said head to enable the head to pass through the bottom portion, said fastener orifice including an oblong top portion opening out into said bottom portion and shaped to match the shank in order to enable the top portion to slide along the gravity axis on either side of said shank until the shank reaches an end wall of the top portion after the head has been inserted through the bottom portion.

It should be observed that the term "vertical" is used herein to designate a direction or a member that extends substantially along the gravity axis.

In order to fasten a support assembly including such an orifice, the operator pushes the body of said assembly towards the fuselage so as to cause a peg to penetrate into a fastener orifice. More precisely, a horizontal movement in a direction towards the fuselage and referred to as a "depth" direction causes the head of the peg to pass through the bottom portion of the fastener orifice.

Once the head of the peg has reached the fastener orifice, the operator pushes the support assembly downwards along the gravity axis. The shank then comes into abutment against the end wall of the top portion.

Such a fastener orifice enables the support assembly to be blocked relative to the fuselage along "two-and-a-half" axes. The oblong top portion of the fastener orifice enables the support assembly to be blocked relative to the peg along both horizontal axes, i.e. along an axis that is substantially perpendicular to the fuselage and referred to as the "horizontal axis in depth", and another axis that is essentially parallel to the fuselage and referred to as the "transverse horizontal axis", for convenience.

In addition, the support assembly can move along the gravity axis in one direction only, halving the availability of the gravity axis.

In order to block the support assembly completely in the vertical direction, the step includes one locking system per vertical orifice.

In an embodiment, the support assembly may have two fastener orifices of the vertical orifice type.

In an alternative embodiment, the support assembly may have one fastener orifice of the vertical orifice type.

Furthermore, said step may include a fastener orifice of the horizontal orifice type having a horizontal slot open to the outside of said support assembly, said slot extending horizontally from said outside towards an end wall.

It is not essential to associate such a horizontal orifice with a locking system. A peg cannot escape from a horizontal orifice along the gravity axis.

In order to install the support assembly, an operator may position a peg in the horizontal orifice and can then position a peg in the vertical orifice.

Furthermore, at least one locking system may comprise a pivotally mounted lever for blocking the shank of a peg in the top portion of a fastener orifice along the gravity axis, the lever being hinged to the body.

The lever can then perform a turning movement so that in a blocking position it holds a peg in a top portion of a vertical orifice, and so as to avoid impeding the movement of a peg along a vertical orifice when the lever is in an unblocking position.

The locking system can thus be a simple mechanical system.

In addition, the locking system may include return means urging the lever from an unblocking position enabling a peg to be inserted in a fastener orifice towards a blocking position enabling the peg to be blocked in the fastener orifice, the return means being connected to the lever and to the body.

The natural position of the lever is thus the blocking position. Only a manual intervention makes it possible to set the system by positioning the lever in the unblocking position. This characteristic seeks to enhance safety.

The unlocking means may also include manual unlocking means connected to each lever in order to request its passage from the blocking position towards the unblocking position. The manual unlocking means may comprise a cable, for example.

Favorably, the unlocking means open out under the tread so as to avoid being operated in error.

In order to block a peg in a fastener orifice, the locking system may include a setting latch that is movable in translation in a vertical direction from an unset position enabling the body to be fastened to pegs towards a set position enabling the body to be separated from the pegs.

While the peg is moving in the fastener orifice, the peg moves the latch. This movement of the latch releases the lever which turns so as to block a peg.

The latch may then comprise retention means for retaining the lever and a return member connecting the retention means to a fixed point of the body, the retention means co-operating by interfering shapes with said lever in order to hold said lever in said unblocking position, the retention means co-operating with a peg to unblock said lever as a result of a peg being inserted in the fastener orifice.

The retention means may comprise a plate having a top plane suitable for blocking a stud of the lever in order to hold it in the unblocking position. During the movement in translation of the retention means under drive from a peg, the stud slides along the stop plane to allow the lever to turn towards the blocking position.

Consequently, a locking system may include for example:
a lever hinged to the body;
a latch having retention means that are connected by a return spring to a fixed point of the body, the retention means being held by the return spring against the vertical orifice in the absence of a peg, the retention means co-operating by interfering shapes with the lever to hold the lever in said unblocking position, the retention means slidably mounted in said body to slide in said body during the movement of said shank along the vertical orifice under drive from said head, said retention means releasing said lever beyond a threshold movement in translation.

In addition, the step may include resilient ejector means facing a bottom portion.

Thus, if an operator does not exert sufficient force to place the support assembly in the blocking position, the return spring tends to move the retention means in the gravity direction. The retention means then in turn move the peg that is inserted in the fastener orifice. At the end of this movement, the head of the peg may be in register with the bottom portion of the fastener orifice.

The ejector means then exert a force on the head of the peg to eject it out from the fastener orifice.

Consequently, if an operator accidentally or erroneously interrupts the operation of fastening the support assembly to a peg, the system enables the peg to be ejected automatically out from the fastener orifice. Thus, the operator does not run the risk of standing on a step that is not properly installed.

It can be understood that the step may also possess a position-identifying mark for marking the position of the locking system. For example, the body may have a slot making it possible to estimate the position of the lever, e.g. by means of a color code.

Furthermore, the body may include one locking housing per locking system, each locking system being carried by a respective locking housing.

The body may have a recess defining the housing, or it may comprise a vertical plane member having the locking housing fastened thereto.

Furthermore, the tread is hinged to the body in a variant that seeks to reduce the overall size of the support assembly, e.g. in a case.

The body may possess a banner of visible color when the tread is deployed in order to make it easier to see the step.

In addition, the tread may include a handle to make it easier to transport the support assembly or for use as a handhold on which a user can pull his or herself up.

Furthermore, the body may include one position-identifying mark per fastener orifice that is visible to an operator in order to enable each fastener orifice to be located.

Finally, for the body having a thrust face facing the fuselage, the step may possess a coating arranged on the thrust face to avoid damaging the fuselage. The coating may cover the thrust face in full or in part. The coating may comprise rubber or any other material suitable for protecting the fuselage against impacts.

In addition to a step, the invention provides an aircraft having a fuselage. The fuselage then includes at least one step of the invention, each peg being secured to the fuselage and projecting from the fuselage, each support assembly being portable and being suitable for being carried in temporary manner by at least two pegs.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 4 is a section view of a support assembly;

FIG. 5 shows a support assembly with two vertical orifices;

FIG. 6 shows a support assembly provided with one vertical orifice and one horizontal orifice;

FIGS. 7 to 12 are diagrams showing a locking system and how it operates;

FIGS. 13 and 14 are diagrams showing a peg blocked on "two-and-a-half axes"; and FIG. 15 shows a variant of retention means.

DETAILED DESCRIPTION OF THE INVENTION

Elements present in more than one of the figures are given the same references in each of them.

It should be observed that three mutually orthogonal axes X, Y, and Z are shown in some of the figures.

The first axis X is said to be the "transverse horizontal axis".

The second axis Y is said to be the "horizontal axis in depth" for convenience to distinguish it from the first axis.

Finally, the third axis Z is said to be the "vertical axis".

Figure 1:
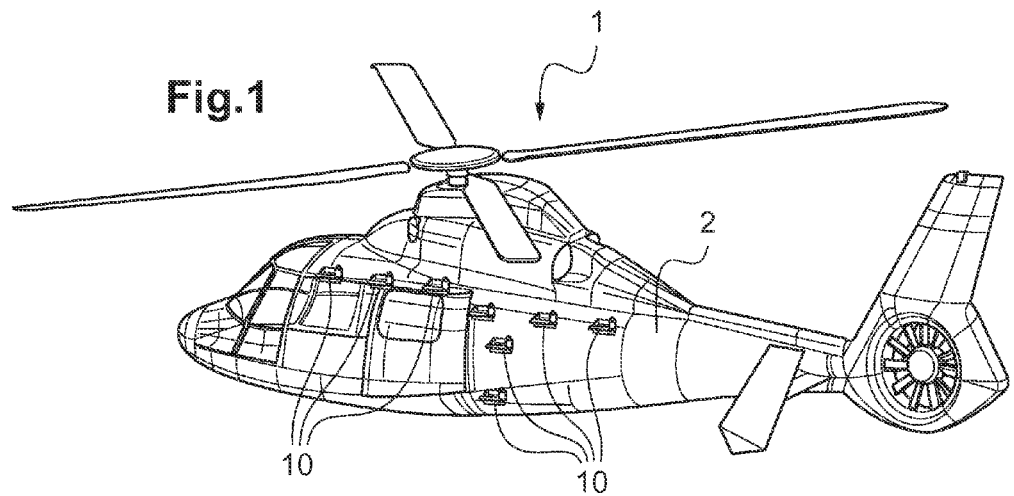
FIG. 1 is a diagram of an aircraft of the invention.

FIG. 1 shows an aircraft 1 having a fuselage 2. More particularly, the aircraft may be a rotorcraft that is provided in particular with a lift-providing rotor carried by the fuselage 2.

The aircraft 1 is provided with a plurality of steps 10.

Figure 2:
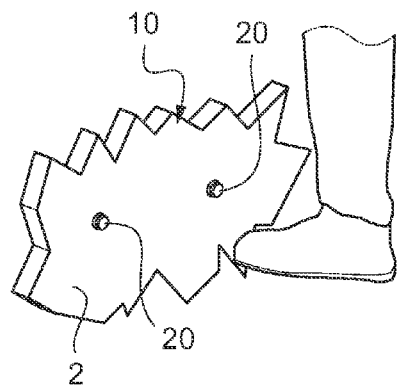
FIG. 2 is a diagram showing a group of pegs for a step.

With reference to FIG. 2, a step 10 includes a group of pegs 14 fastened to the fuselage.

Figure 3:
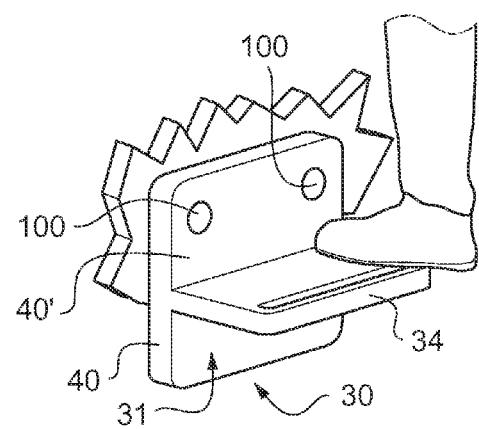
FIG. 3 is a diagram showing a support assembly of a step.

Furthermore, and with reference to FIG. 3, a step 10 possesses a portable support assembly 30 that can be suspended from the fuselage 2 by means of the pegs 20.

For example, the fuselage has a plurality of groups of pegs arranged at a plurality of zones on the aircraft. A support assembly can then be arranged in a plurality of different zones on the aircraft.

The support assembly 30 possesses a body 40 that co-operates with the pegs. For this purpose, the body 40 possesses fastener orifices that are masked in FIG. 3 and that can be engaged on the pegs of a group.

To facilitate installing a step, the body 40 may possess one position-identifying mark 100 per fastener orifice and visible to an operator.

Furthermore, the body may also possesses a visual indicator, e.g. of the flag marker type, so that an operator can easily visualize the position of a support assembly.

Furthermore, the support assembly 30 includes a tread 31 carried by the body 40.

It should be observed that the tread 31 may be fastened in a middle zone of the body 40. Under such circumstances, the top portion 40' of the body 40 forms a shield between the operator's foot and the fuselage, e.g. so as to protect the fuselage against a kick.

In another aspect, the support assembly is portable. Consequently, the tread 31 may include a handle 34. The operator can move the support assembly by taking hold of the handle 34.

With reference to FIG. 4, the tread 31 may be hinged to the body 40 so as to be pivotally mounted. For example, the support assembly possesses a hinge 32 enabling the tread 31 to pivot about a horizontal pivot axis AX1 extending along a transverse horizontal axis Y.

The support assembly optionally includes a foldable strut 33 that is hinged about a vertical pivot axis AX2. The strut then serves to support the tread 31.

In order to protect the fuselage, the step may be provided with a protective coating 90 arranged on a thrust face 45 of the body 40 facing a fuselage 2.

Furthermore, each peg 20 comprises a base 21 that may be fastened to a fuselage by conventional means, a head 22 and a shank 23 connecting the base 21 to the head 22. The dimensions of the head 22 are greater than the dimensions of the shank 23. Thus, a section of the head 22 presents an area that is greater than the area of a section of the shank 23.

Each fastener orifice 50 is dimensioned to enable the shank 23 of a peg to be inserted into the fastener orifice and to move therein.

Thus, with reference to FIG. 5, each fastener orifice 50 may be an orifice that is referred to as a "vertical" orifice 50'.

A vertical orifice 50' has a bottom insertion portion 51 matching the shape of the head 22 of a peg 20. In other words, the bottom portion possesses dimensions enabling the head 22 of a peg to pass through this bottom portion. When the head is a circular cylinder having a first diameter, the bottom portion 51 may be circular in shape with a second diameter that is greater than the first diameter.

Furthermore, a vertical orifice 50' has a top portion 52 extending the bottom portion upwards to a stop.

Thus, the top portion 52 is an oblong slot projecting from the bottom portion 51 and terminated by an end wall 53. The top portion 52 matches the shape of the shank 23 of a peg so as to enable the top portion 52 to slide under gravity on either side of the shank 23 of a peg, until the peg reaches an end wall 53.

In order to suspend the body 40 from two pegs, the operator pushes the body 40 so as to insert the pegs into the bottom portions of the fastener orifices, and then exerts traction in the downward direction to cause the top portions of the fastener orifices to slide along the shanks of the pegs.

With reference to FIG. 13, each shank 23 is then blocked in the top portion 52 against moving along a transverse horizontal axis in directions represented by arrows F1 and F1'.

Furthermore, each shank 23 is blocked in the top portion 52 by the end wall 53 against moving vertically upwards as represented by arrow F2.

The support assembly is then prevented from moving relative to the fuselage 2 along said transverse horizontal axis and downwards along the vertical axis, i.e. in the direction opposite to said upward vertical direction.

With reference to FIG. 14, the support assembly also cannot move relative to the fuselage 2 along a horizontal axis in depth in directions represented by arrows F3 and F3'.

A wall of the body 40 is wedged between the fuselage 2 and the heads 22 of the pegs, these heads 22 pressing against an inside face 46 of the body through which the fastener orifices are made.

With reference to FIG. 6, the support assembly 30 of the step may also include a fastener orifice 50 of the "horizontal" orifice type 50. For example, a vertical orifice is combined with a horizontal orifice.

Such a horizontal orifice has a horizontal slot 54 opening to the outside EXT. This horizontal slot 54 then extends horizontally from the outside EXT towards an end wall 55.

The horizontal slot is shaped to match the size of the shanks of the pegs.

Thus, the operator begins by inserting such a shank into the horizontal slot 54 and moves the support assembly transversely until engaging the end wall 55 of the horizontal slot 54. Thereafter, the operator places the other peg in a vertical orifice using the method described above.

Furthermore, the step has a locking system 60, shown roughly in FIG. 4, serving to block the support assembly vertically not only in a single direction but in two opposite directions. The step optionally includes one locking system per vertical orifice.

The body may have a member presenting a recess for receiving the locking system.

In a variant, the body 40 may possess a plane member 41 and a locking housing 42. Each locking system 60 is then carried by a locking housing 42 of the body. The housing may then comprise a wall presenting a fastener orifice of the body.

The locking system is an automatic system activated by inserting a peg in a fastener orifice.

The support assembly is then secured to the fuselage in automatic manner.

Furthermore, the step includes unlocking means 85 for acting on the contrary to enable a support assembly to be released manually. In the example shown, the unlocking means 85 have manual unlocking means 86 of the type comprising a cable extending below the step 31.

The unlocking means are then mechanically and functionally connected to the locking system.

FIGS. 7 to 12 explain the structure and the operation of the locking system and of the unlocking means.

The locking system has a lever 61 hinged to the body 40, and more specifically, hinged to a housing of the body in the example shown.

The lever may be L-shaped so as to present a first branch 62 for blocking a peg and a second branch 63 for co-operating with the manual unlocking means 86. The intersection between the two branches is then hinged to the body about a hinge 64.

A return spring 66 may also connect the second branch 63 of the lever 61 to a fixed point of the body, e.g. a fixed point of the housing. The return spring 66 tends to turn the lever towards the fastener orifice in order to block a peg in the fastener orifice. The return spring 66 thus exerts a force on the lever to move it from the unblocking position shown in FIG. 7 to the blocking position shown in FIG. 9.

It should be observed that the lever does not shut the fastener orifice in the unblocking position so as to avoid impeding insertion of a peg into the fastener orifice.

Furthermore, FIG. 7 shows the presence of a setting latch 70. The latch 70 is movable in translation along a vertical axis Z from an unset position enabling the body 40 to be fastened on pegs 20 towards the set position shown in FIG. 9.

This latch 70 comprises retention means 71 for blocking said lever 61, and a return member 75 connecting the retention means 71 to a fixed point of the body 40. When the body has a locking housing 42, the fixed point may be a point on the locking housing 42.

The retention means comprise a plate against an inside face 46 of the wall of the body that is pierced by a fastener orifice that is to be made safe. This plate is provided with a stop plane 72 suitable for blocking a stud 65 of the lever where they intersect. This stop plane 72 may be inclined as in the embodiment of FIG. 7, or it may be vertical as in the embodiment of FIG. 15.

It should be observed that opposite from the stop plane, the retention means may present a sloping plane 73 contributing to resetting the locking Under such circumstances, in the absence of a peg, the retention means are in the set position for holding the lever in the unblocking position. The retention means are pressed against the fastener orifice without closing it in full. Specifically, the retention means do not shut the bottom portion of the fastener orifice.

In order to install the support assembly against a fuselage, the operator then pushes the support assembly towards the fuselage along arrow F4 in order to introduce the peg into the fastener orifice.

With reference to FIG. 8, the operator then moves the support assembly downwards along arrow F5. The shank of the peg then moves into the top portion of the fastener orifice. In parallel, the head 22 of the peg moves the retention means 71 along arrow F6. The stud of the lever 61 slides along the stop plane of the retention means 71 in order to escape therefrom.

With reference to FIG. 9, the retention means 71 then release the lever 61. The lever 61 then turns so as to pass into the blocking position. The lever is thus against the inside face so as to shut the bottom portion in part. The peg is then wedged vertically between the end wall of the fastener orifice and the lever 61.

With reference to FIG. 10, and in order to remove the support assembly, the operator pulls on the manual unlocking means 86. The lever then turns towards its unblocking position. In parallel, the retention means move downwards under force from the return member 75 towards the setting position. Optionally, the operator pushes the support assembly upwards in order to make it easier for the peg to move down towards the bottom portion of the fastener orifice.

As shown in FIG. 11, at the end of this manipulation, the peg can be extracted from the bottom portion of the fastener orifice.

With reference to FIG. 12, if the operator does not carry out the step leading to the support assembly being blocked against a peg in full, the return spring and the return member tend to return the locking system to its initial position.

Furthermore, the step may include ejector means 80 to avoid leaving the support assembly in an unstable position. The ejector means may comprise a spring blade, for example.

The ejector means thus exert a force on the head 22 tending to move the support assembly away from the fuselage 2 along arrow F7.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A step for an aircraft, the step comprising a support assembly provided with a vertical body carrying a tread, wherein said support assembly is portable, the step including:
    at least two fastener pegs suitable for fastening to a fuselage of an aircraft, said body having one fastener orifice per peg, said body being carried by said pegs when the body is moved manually towards a fuselage so as to cause each peg to penetrate into a respective fastener orifice;
    at least one locking system carried by said body for automatically locking a position of at least one peg in a fastener orifice; and
    unlocking means connected to the locking system to enable the body to be separated manually from the pegs.

2. A step according to claim 1, wherein each peg comprises a base connected to a head by a shank of dimensions smaller than the dimensions of said head, at least one fastener orifice is a vertical orifice having a bottom inlet portion that is shaped to match said head to enable the head to pass through the bottom portion, said fastener orifice including an oblong top portion opening out into said bottom portion and shaped to match the shank in order to enable the top portion to slide in a gravity direction on either side of said shank until the shank reaches an end wall of the top portion after the head has been inserted through the bottom portion.

3. A step according to claim 2, wherein said step includes one locking system per vertical orifice.

4. A step according to claim 1, wherein said step includes a fastener orifice of a horizontal orifice type having a horizontal slot open to the outside of said support assembly, said slot extending horizontally from said outside towards an end wall.

5. A step according to claim 2, wherein at least one locking system comprises a pivotally mounted lever for blocking said shank in said top portion of a fastener orifice in the gravity direction, said lever being hinged to the body.

6. A step according to claim 5, wherein said locking system includes return means urging the lever from an unblocking position enabling a peg to be inserted in a fastener orifice towards a blocking position enabling a peg to be blocked in a fastener orifice, the return means being connected to the lever and to the body.

7. A step according to claim 5, wherein said locking system includes a setting latch that is movable in translation in a vertical direction from an unset position enabling the body to be fastened to pegs towards a set position enabling the body to be separated from the pegs.

8. A step according to claim 7, wherein said latch comprises retention means for retaining said lever and a return member connecting the retention means to a fixed point of the body, the retention means co-operating by interfering shapes with said lever in order to hold said lever in an unblocking position, the retention means co-operating with a peg to unblock said lever as a result of a peg being inserted in the fastener orifice.

9. A step according to claim 5, wherein said locking system includes:
    a lever hinged to the body; and
    a latch having retention means connected by a return spring to a fixed point of the body, the retention means being held by the return spring against the vertical orifice in the absence of a peg, the retention means co-operating by interfering shapes with said lever to hold said lever in an unblocking position, the retention means slidably mounted in said body to slide in said body during movement of said shank along the vertical orifice under drive from said head, said retention means releasing said lever beyond a threshold movement in translation.

10. A step according to claim 2, wherein said step includes resilient ejector means facing a bottom portion.

11. A step according to claim 5, wherein said unlocking means include manual unlocking means connected to each lever.

12. A step according to claim 1, wherein said body includes one locking housing per locking system, each locking system being carried by a respective locking housing.

13. A step according to claim 1, wherein said step is hinged to said body.

14. A step according to claim 1, wherein said step includes a handle.

15. A step according to claim 1, wherein said body includes one position-identifying mark per fastener orifice that is visible to an operator in order to enable each fastener orifice to be located.

16. A step according to claim 1, wherein said body includes a thrust face facing the fuselage, the step having a coating arranged on said thrust face to avoid damaging said fuselage.

17. An aircraft provided with a fuselage, wherein the aircraft includes at least one step according to claim 1, each peg being secured to the fuselage and projecting from said fuselage, each support assembly being portable and being suitable for being carried in temporary manner by at least two pegs.

* * * * *